United States Patent
Saito

(10) Patent No.: US 7,822,322 B2
(45) Date of Patent: Oct. 26, 2010

(54) OPTICAL DISK DEVICE

(75) Inventor: Shoji Saito, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1072 days.

(21) Appl. No.: 11/522,974

(22) Filed: Sep. 19, 2006

(65) Prior Publication Data

US 2007/0065121 A1 Mar. 22, 2007

(30) Foreign Application Priority Data

Sep. 20, 2005 (JP) .............................. 2005-272112

(51) Int. Cl.
*H04N 9/79* (2006.01)
*H04N 5/00* (2006.01)
(52) U.S. Cl. .......................... 386/125; 386/126; 386/45
(58) Field of Classification Search .................. 386/1, 386/45–46, 52, 125–126
See application file for complete search history.

(56) References Cited

U.S. PATENT DOCUMENTS

2005/0114214 A1* 5/2005 Itoh ............................. 705/14

2007/0112800 A1* 5/2007 Seidl et al. ................... 707/100

FOREIGN PATENT DOCUMENTS

| JP | 2000-295558 | 10/2000 |
| JP | 2002-290863 | 10/2002 |
| JP | 2003-230080 | 8/2003 |

* cited by examiner

*Primary Examiner*—Thai Tran
*Assistant Examiner*—Nigar Chowdhury
(74) *Attorney, Agent, or Firm*—Pillsbury Winthrop Shaw Pittman, LLP

(57) ABSTRACT

When a break in data is detected by a detection unit, an audio output stoppage command unit commands a digital audio processing device connected to an audio output unit to stop output of audio. A sampling frequency checking unit checks whether or not the sampling frequency of the audio data before the break, and the sampling frequency of the audio data after the break, are the same. When the sampling frequency checking unit detects that these sampling frequencies are the same, an audio output stoppage elimination command unit waits until a fixed time period has elapsed, and then returns the reading position upon the optical disk at which the reading unit reads in data to a position directly after the break, and also commands the digital audio processing device to eliminate the stoppage of output of audio.

3 Claims, 5 Drawing Sheets

| IDENTIFICATION NUMBER | TITLE NAME | RECORDING DATE AND TIME | PREVIOUS REPLAY TIME | PREVIOUS REPLAY DATE AND TIME | NUMBER OF TIMES REPLAYED | REPLAY COMPLETED CONDITION |
|---|---|---|---|---|---|---|
| 0001 | TITLE A | 05-08-21 19:00-19:30 | 10:15 | 05-08-23 20:13-20:23 | 2 | REPLAY ALMOST COMPLETED |
| | TITLE B | 05-08-21 20:00-20:55 | 54:08 | 05-08-21 23:01-23:55 | 1 | REPLAY ALMOST COMPLETED |
| | TITLE C | 05-08-22 21:00-22:00 | — | — | 0 | — |
| | TITLE D | 05-08-25 13:00-13:30 | 02:35 | 05-08-28 19:00-19:02 | 1 | ALMOST NOT REPLAYED |
| 0002 | TITLE AX | 05-08-30 10:00-11:30 | 85:15 | 05-08-30 20:00-21:25 | 1 | REPLAY ALMOST COMPLETED |
| | TITLE BX | 05-08-30 19:00-19:30 | 03:13 | 05-08-31 19:03-19:06 | 2 | REPLAY ALMOST COMPLETED |
| | TITLE CX | 05-08-31 21:00-22:50 | 65:15 | 05-09-02 19:13-20:18 | 1 | MANY NON-REPLAYED PORTIONS |
| | TITLE DX | 05-09-04 19:30-19:58 | 25:18 | 05-09-07 19:00-19:25 | 5 | REPLAY ALMOST COMPLETED |
| | TITLE EX | 05-09-05 19:00-19:30 | 01:03 | 05-09-07 18:55-19:56 | 2 | ALMOST NOT REPLAYED |
| | TITLE FX | 05-09-06 21:00-22:10 | — | — | 0 | — |
| ... | ... | ... | ... | ... | ... | ... |

FIG.2

FIG.5
| | | |
|---|---|---|
| 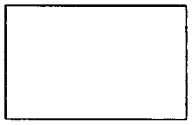 |  |  |
| TITLE XA<br>RECORDING TIME : 30:00 | TITLE XB<br>RECORDING TIME : 30:00 | TITLE XC<br>RECORDING TIME : 110:00 |
| 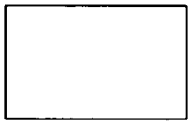 |  |  |
| TITLE XD<br>RECORDING TIME : 28:00 | TITLE XE<br>RECORDING TIME : 30:00 | TITLE XF<br>RECORDING TIME : 70:00 |
REPLAY HISTORY INFORMATION
| PREVIOUS REPLAY TIME | PREVIOUS REPLAY DATE AND TIME | NUMBER OF TIMES REPLAYED | REPLAY COMPLETED CONDITION |
|---|---|---|---|
| 03:13 | 05-08-31<br>19:03-19:06 | 2 | REPLAY ALMOST COMPLETED |

OPTICAL DISK DEVICE

CROSS REFERENCE

This Nonprovisional application claims priority under 35 U.S.C. §119(a) on Patent Application No. 2005-272112 filed in Japan on Sep. 20, 2005, the entire contents of which are hereby incorporated by reference.

BACKGROUND OF THE INVENTION

The present invention relates to an optical disk device which replays a title recorded upon an optical disk such as a DVD or the like.

In the prior art, optical disk devices which read and replay data for titles recorded upon DVDs are widely used and generally popular. A typical such optical disk device outputs a title menu image in which, for each title recorded upon the DVD, the title name and its recording date and time and so on are displayed as a list, and is endowed with a function of allowing the user to select a title to be replayed. This title menu image is displayed upon a display device which is connected to the main body of the device. The user checks the title names which are displayed in this title menu image, and selects the title to be replayed.

Furthermore, proposals for display formats for such a title menu image have been made in Japanese Laid-Open Patent Publication 2000-295558, Japanese Laid-Open Patent Publication 2002-290863, and Japanese Laid-Open Patent Publication 2003-230080. Japanese Laid-Open Patent Publication 2000-295558 proposes to display, along with an EPG (Electronic Program Guide), as a private channel, the titles recorded upon the optical disk and the title names of non-recorded titles which have been scheduled for recording. Furthermore, Japanese Laid-Open Patent Publication 2002-290863 proposes to display the title list image by classifying it into a portion for which processing has been completed, and a portion for which this is not the case. Moreover, Japanese Laid-Open Patent Publication 2003-230080 proposes to display, in the title menu image, viewing restriction information and the lengths (replay times) of the titles and so on.

However, with prior art optical disk devices, it has not been possible for the user to check the following items (1) through (4) upon the title menu image:

(1) Whether a title has not yet been replayed;

(2) If it is a title which has been previously replayed, whether it is one which has been almost completely replayed, or, conversely, whether it is a title of which only a portion has been replayed and of which comparatively many portions have not been replayed (non-replayed portions);

(3 When a title was most recently replayed; and (4) The number of times a title has been previously replayed.

Due to this, each time the title menu image is displayed, it has been necessary for the user to decide upon the above matters (1) through (4) from the title names and so on, based upon his own memory, and sometimes it may happen that he mistakenly decides that a title which actually has not been replayed has already been replayed, or, conversely, that he mistakenly decides that a title which has already been replayed is one which has not been replayed. Furthermore, in order to make the above described decision for a title for which his memory is unclear as to whether or not it has been replayed, the user has had no option other than to replay this title, in order to check its contents. Thus, with an optical disk device according to the prior art, there has been the problem that the user experience during selection of a title for replay is not good.

SUMMARY OF THE INVENTION

The present invention includes an output unit which outputs to a display device a title menu image, in which is displayed a list of title names of titles which are recorded upon an optical disk. Furthermore, there are included a selection unit which selects any desired title from among the titles whose title names are displayed in the title menu image, and a replay unit which, when replay of a title has been commanded, starts replay of the title selected by the selection unit at that time point.

The output unit outputs the title menu image in which are displayed, for a title which is recorded upon the optical disk, the replay time the previous time, the date and time of the replay the previous time, and the number of times that title has been replayed up until now. The user is able to check the following items (1) through (4) which are displayed upon the title menu image:

(1) Whether or not this is a title which has not yet been replayed;

(2) If this is a title which has been previously replayed, whether it is one which has been almost completely replayed, or, conversely, whether it is a title of which only a portion has been replayed and of which comparatively many portions have not been replayed (non-replayed portions);

(3) When this title was most recently replayed; and (4) The number of times it has been previously replayed.

Since, in this manner, information is provided upon the title menu image which considerably assists operation for selecting a title to be replayed, accordingly it is possible to anticipate an enhancement of the user experience.

Furthermore, this optical disk device comprises: a replay history information acquisition unit which acquires, for each title recorded upon the optical disk, replay history information which includes the replay time for that title when it was replayed the previous time, the date and time of the replay the previous time, and the number of times that title has been replayed up until now; and an update unit which, when replay of a title has been performed by the replay unit, updates the replay history information for the title which has been replayed this time. Due to this, it is possible to provide the user who is selecting a title for replay with adequate information.

BRIEF DESCRIPTION OF THE DRAWINGS

FIG. 2 is a figure showing replay history information which this DVD device according to an embodiment of the present invention is storing in a replay history information storage area;

FIG. 5 is a figure showing a title menu image which is outputted by the DVD device of this embodiment.

DETAILED DESCRIPTION OF THE INVENTION

Figure 1:
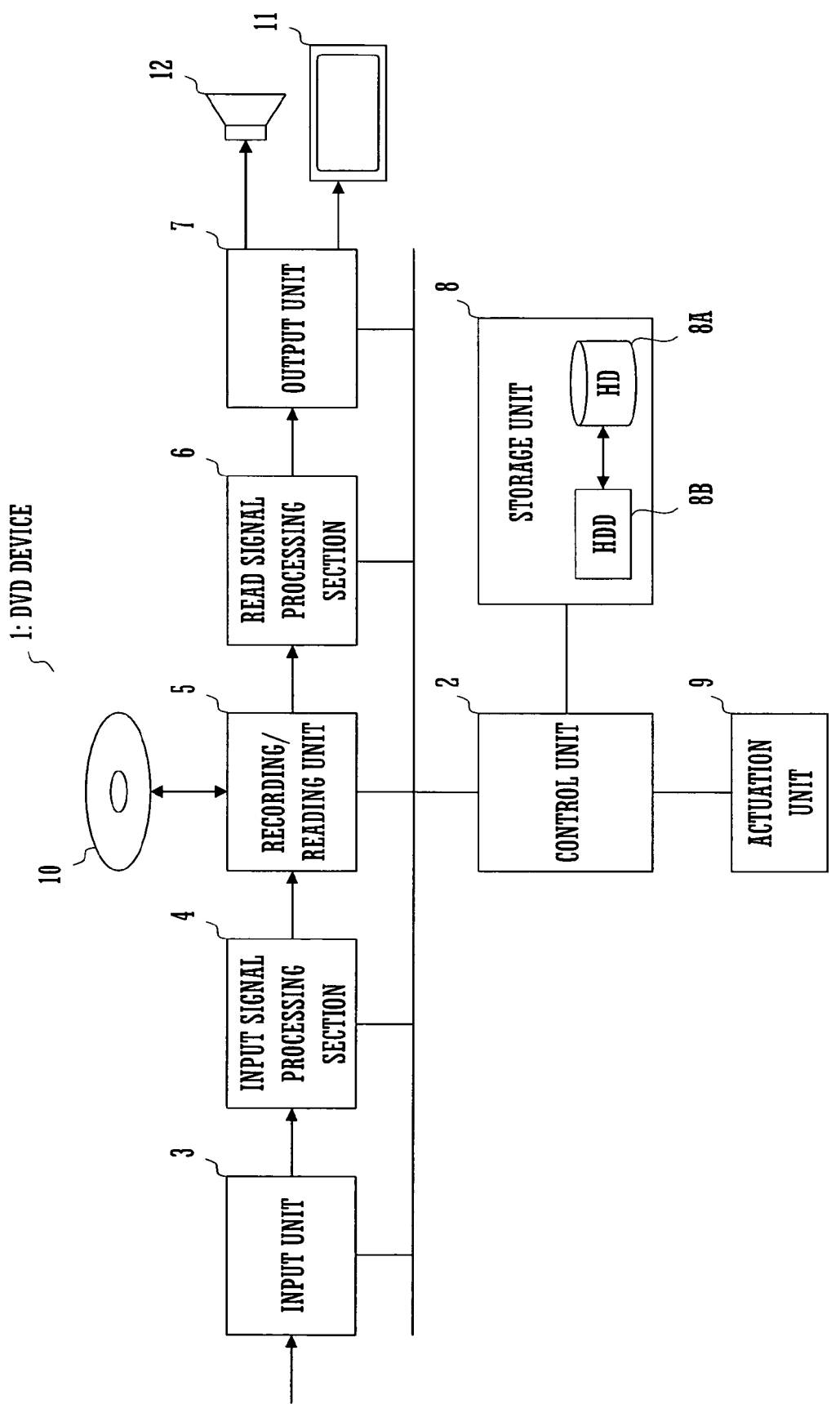
FIG. 1 is a block diagram showing the structure of the main portion of a DVD device according to an embodiment of the present invention.

FIG. 1 is a block diagram showing the structure of the main portion of a DVD device which is an embodiment of the present invention. The DVD device 1 of this embodiment comprises a control unit 2 which controls the operation of the main portion of the device. The DVD device of this embodiment performs recording of titles upon a DVD 10 and replay of titles which are recorded upon the DVD 10. The control unit 2 is endowed with a calendar function of managing the current date, a timekeeping function of managing the current time, and a title menu image generation function of generating a title menu image which will be described hereinafter. This title menu image generation function is a function of generating a so called OSD image.

Furthermore, the DVD device 1 comprises an input unit 3, a recording signal processing section 4, a recording/reading unit 5, a read signal processing section 6, an output unit 7, a storage unit 8, and an actuation unit 9. Titles which are recorded upon the DVD 10 are inputted to the input unit 3. A television signal which has been received by an antenna not shown in the figures is inputted to the input unit 3. The input unit 3 comprises a tuner which extracts, from this inputted television broadcast signal, the television broadcast signal of a selected channel. The input unit 3 inputs this television broadcast signal extracted by the tuner to the recording signal processing section 4. Furthermore, sometimes a title signal for recording upon the DVD 10 is inputted to the input unit 3 from some other connected device. The input unit 3 also inputs this title signal which has been inputted from the other device to the recording signal processing section 4.

If the signal of the title inputted from the input unit 3 is an analog signal, then the recording signal processing section 4 converts it into a digital signal. The recording signal processing section 4 acquires the video data and audio data of this title from the signal of the inputted title, encodes this video data and audio data which have thus been acquired, converts the encoded video data and audio data into packets by predetermined units, and creates a system stream in which these are multiplexed together. And the recording signal processing section 4 inputs this system stream to the recording/reading unit 5 as recording data to be recorded upon the DVD 10.

The recording/reading unit 5 comprises a pickup head (not shown in the figures) which irradiates laser light upon the DVD 10 and detects the resultant reflected light, and a servo control unit (also not shown in the figures) which performs focus servo control and tracking servo control and the like for controlling the position of irradiation of this laser light irradiated upon the DVD 10. Furthermore, the recording/reading unit 5 performs recording control to modulate the laser light irradiated upon the DVD 10, based upon the recording data to be recorded on this DVD 10. Moreover, the recording/reading unit 5 reads in the recording data of the title which is being recorded on the DVD 10, and inputs it to the read signal processing section 6 as a read signal, a so called RF signal.

The read signal processing section 6 processes this read signal which has been inputted and acquires the system stream therefrom, and separates and extracts the video data and the audio data from this system stream. Furthermore, the read signal processing section 6 decodes this video data and audio data which have thus been extracted, and inputs the decoded video data and audio data to the output unit 7.

A display device 11 which displays an image and a speaker 12 which emits sound are connected to the output unit 7. The output unit 7 outputs a replay video signal based on the video data inputted from the read signal processing section 6, and a replay audio signal based upon the audio data therefrom, in synchronism. This replay video signal is inputted to the display device 11. The display device 11 displays an image based upon the replay video signal which has thus been inputted. Furthermore, the speaker 12 emits a audio based upon the replay audio signal which has thus been inputted. Moreover, the output unit 7 also is endowed with a function of generating and outputting a title menu image with the control unit 2. An analog output terminal which outputs the replay video signal and the replay audio signal as analog signals, and a digital output terminal which outputs the replay video signal and the replay audio signal as digital signals, are provide to the output unit 7.

The storage unit 8 comprises a hard disk 8A (the HD 8A) which is a storage medium, and a hard disk drive 8B (the HDD 8B) which performs recording of data upon this hard disk 8A and reading of data therefrom. On the hard disk 8A of the storage unit 8, for each DVD 10, there is provided a replay history information storage area which stores replay history information for each title which is recorded upon that DVD 10. This replay history information, as shown in FIG. 2, is information which establishes a correspondence between an identification number which identifies the DVD 10, and replay history information for each title which is recorded upon the DVD 10 identified by that identification number. In the replay history information, there is included information such as: the title name; the date and time of recording; the previous replay time; the previous replay date and time; the number of times it has been replayed up till the present; a replay completed condition which classifies this title under three headings: that it is a title which has previously been almost completely replayed, that it is a title which has been replayed to some extent, and that it is a title which has almost not been replayed at all; and the like. This classification according to the replay completed condition may be, for example: that it is a title which has been almost completely replayed, if the portion of the title which has been replayed is 85% or more of its entirety; that it is a title which has been replayed to some extent, if 10% or more and less than 85% of its entirety has been replayed; and that it is a title which has almost not been replayed at all, if less than 10% of its entirety has been replayed.

It should be understood that the replay completed condition is a state which is decided upon generally from the replaying history up until the present moment, and is not a state which is decided upon according only to the most recent replay episode. In other words, even if the replay episode the previous time was only for a very short time period, if this is a title which has been played for 85% or more in the past, then its replay completed condition becomes that it is a title which is almost completely replayed.

The actuation unit 9 comprises a plurality of control keys, and a remote control reception unit which receives control codes for the device main portion, transmitted from a remote control device not shown in the figures. This actuation unit 9 notifies codes corresponding to the control keys which the user has actuated, and control codes which it has received with the remote control reception unit, to the control unit 2.

Next, the operation of the DVD device 1 of this embodiment will be explained. The DVD device of this embodiment can record a title upon a DVD which is set into its main portion. With regard to recording of a title upon this DVD 10, this is performed in roughly the same manner as in the case of a per se conventional DVD device. Now, this recording of a title upon a DVD 10 will be explained in simple terms. This DVD device 1 starts recording a title upon a DVD 10, when input is present for starting of recording of the title upon the DVD 10, or when a recording start time instant is reached for recording of a title which is scheduled to be recorded. The title to be recorded upon the DVD 10 is inputted to the input unit 3. Along with the recording signal processing section 4 encoding the video data and the audio data of the title which is to be recorded upon the DVD 10, this encoded video data and audio data are made into packets, and a system stream is created in which these are multiplexed together. The recording/reading unit 5 pulse modulates the laser light which the pickup head irradiates upon the DVD 10 based upon this system stream which has been generated by the recording signal processing section 4, and controls the power of the laser and so on. Furthermore, it records information such as the name of the title which is being recorded this time, the recording date and time, the recording start position, the recording end position, and the like upon the DVD 10.

Figure 3:
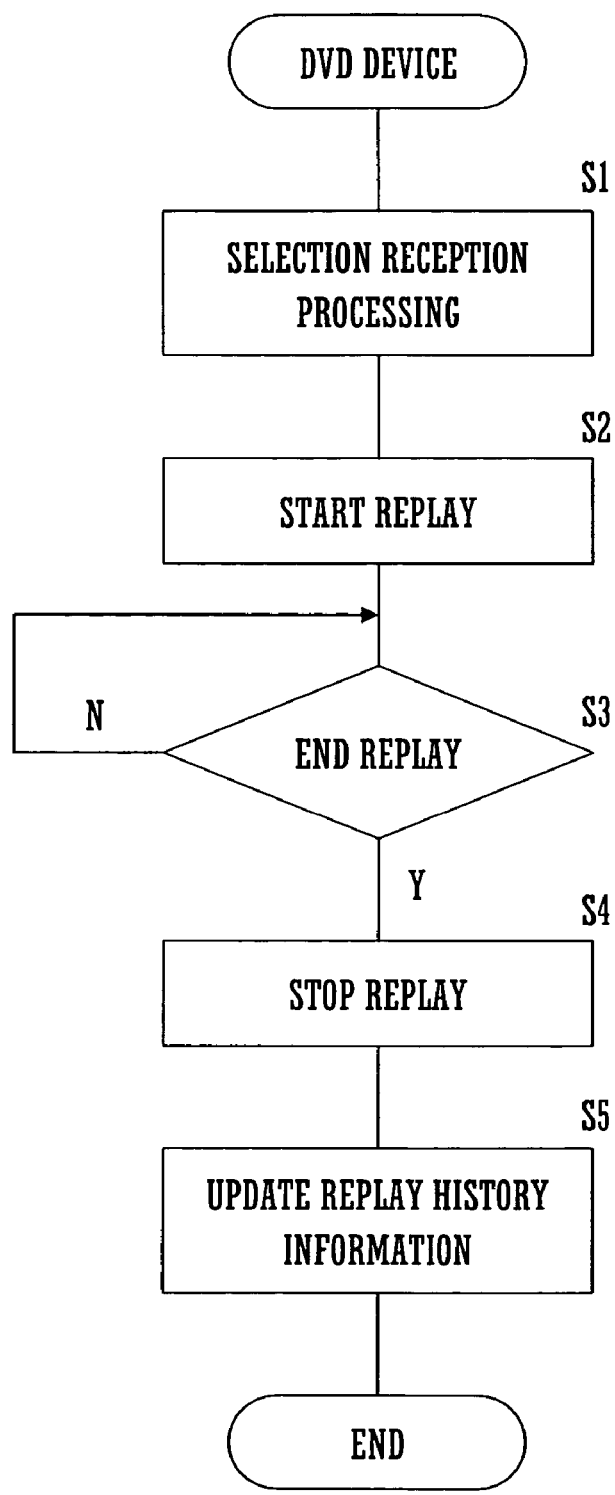
FIG. 3 is a flow chart showing the replay operation of the DVD device of this embodiment.

Next, the replaying of a title which is recorded upon the DVD 10 will be explained. FIG. 3 is a flow chart showing the replay operation of the DVD device of this embodiment. The DVD device 1 performs selection reception processing for receiving selection of the title which is to be replayed, from among the titles which are recorded upon the DVD 10 (step S1).

Figure 4:
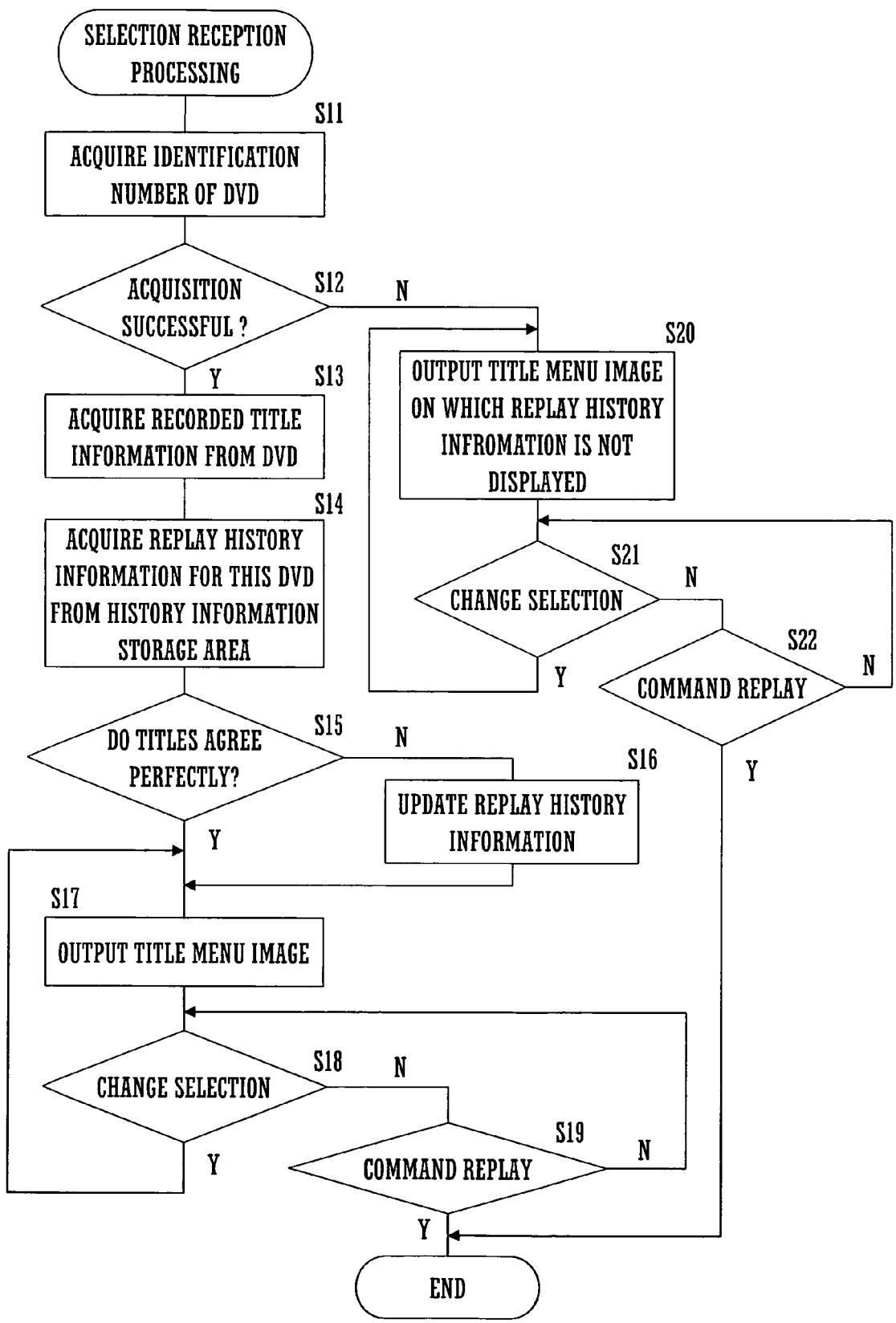
FIG. 4 is a flow chart showing selection reception processing by the DVD device of this embodiment.

FIG. 4 is a flow chart showing the selection reception processing in the step S1. The DVD device 1 acquires the identification number which is recorded in a predetermined recording region upon the DVD 10 (step S11). With the DVD device of this embodiment, when a DVD 10 has been inserted and set, it is detected whether or not an identification number is recorded in the predetermined recording region of this DVD 10, and, if no such number is recorded, then processing is performed to record an identification number in the predetermined recording region of this DVD 10. This processing is performed when recording the above described title upon the DVD 10. The identification number which is appended to the DVD 10 at this time is a serial number. In concrete terms the DVD device 1 appends, to a DVD 10 for which no identification number is recorded in the predetermined recording region, an identification number which is generated by adding 1 to the maximum value of the identification numbers of the DVDs 10 which are stored in the replay history information storage area of the hard disk 8A of the storage unit 8.

The DVD device 1 decides whether or not it has been possible to acquire the identification number of the DVD 10 (step S12). In concrete terms, it decides whether or not an identification number has been read from the predetermined recording region of the DVD 10. And, when the DVD device 1 decides that it has been possible to acquire an identification number in the step S12, then it reads in and acquires from the DVD 10, for each of the titles which are recorded upon this DVD 10, information such as the name of that title, and its recording date and time and so on (step S13). Furthermore, the DVD device 1 searches the replay history information storage area of the hard disk 8A of the storage unit 8 using the identification number which it has acquired in the step S11 as a key, and reads in the replay history information for the DVD 10 having that identification number (step S14). The DVD device 1 makes a decision as to whether or not the title recorded on the hard disk which has been read in the step S13, and the title included in the replay history information read in from the replay history information storage area of the hard disk 8A in the step S14, agree with one another perfectly (step S15). In the step S15, it is decided whether or not, between the replay time before and the replay this time, a new title has been recorded upon this DVD 10, or a title which is recorded upon the DVD 10 has been deleted.

If the DVD device 1 decides in the step S15 that the titles do not agree with one another perfectly, then the replay history information for that DVD 120 in the replay information storage area of the hard disk 8A is updated (step S16). In concrete terms, if a new title has been recorded upon the DVD 10, then the title name of this title, its recording date and time, its replay time last time, its replay date and time last time, the number of times it has been replayed up until the present, and its replay completed condition are added to the replay history information for this DVD 10 which is stored in the replay history information storage area of the hard disk 8A. At this time the replay information is added to by using, for the title name and the recording date and time, the title name and the recording date and time which were acquired in the step S13, while leaving blank the replay time last time, the replay date and time last time, the number of times this title has been replayed up until the present, and its replay completed condition. Furthermore, if a title which was recorded upon the DVD 10 has been deleted, the replay history information for this deleted title is deleted from the replay history information for this DVD 10 which is stored in the replay history information storage area of the hard disk 8A.

If, in the step S15, the control unit 2 of the DVD device 1 has decided that the titles agree with one another, or after having performed the processing in the step S16, then it creates and outputs the title menu image from the output unit 7 (step S17). The title menu image which is generated here is one which is based upon the replay history information at this time point. In other words, if the processing of the step S16 described above has been performed, the DVD device 1 creates a title menu image based upon the replay history information which has been processed in the step S16. FIG. 5 is a figure showing an example of the title menu image which is displayed upon the display device. As shown in FIG. 5, this title menu image is an image in which representative images for each title recorded upon the DVD 10 are displayed as a list. Furthermore, the title which is shown by a thicker frame in FIG. 5 is the title which is selected at this time point. The representative image for each title may be a stationary image; or it would also be acceptable to arrange for a moving image to be displayed only for the title which is selected (but stationary images for the other titles which are not selected). Furthermore, under the representative image for each title, its title name and its recording time are displayed. The actual representative images for the titles are omitted from FIG. 5. Furthermore, for the title which is selected, its replay time last time, its replay date and time last time, the number of times it has been replayed up until the present, and its replay completed condition are displayed in the lower portion of the screen as the replay history information for this title which is selected.

Accordingly, from the replay history information which is displayed in the title menu image, the user is able to confirm the following matters (1) through (5) for the title which is selected at this time point:

(1) Whether it is a title which has not been replayed even once;

(2) If it is a title which has been previously replayed, up to which point it was viewed when it was replayed the previous time, and from which point it has not been viewed;

(3) The data and time it was previously replayed;

(4) The number of times it has been previously replayed; and (5) Whether it is a title which, previously, has been almost completely replayed.

Furthermore, it would also be acceptable to arrange also to display, as an addition to the replay history information, the time which was not replayed the previous time (the time period obtained by subtracting the replay time the previous time from the total time of the title).

In this manner, with the DVD device 1 of this embodiment, via this title menu image, for each title which is recorded upon the DVD 10, it is possible to provide to the user sufficient information related to its replay history up till now. Accordingly, when selecting a title to be replayed from among the titles which are recorded upon the DVD 10, it is possible considerably to enhance the user experience.

By actuating a cursor key which is provided upon the actuation unit 9, or a cursor key which is provided upon the remote control device, it is possible for the user to change over the title which is selected. With this DVD device 1, when a change over of the selected title is inputted (step S18), the flow of control returns to the step S17, and a title menu image is created and is outputted from the output unit 7 with replay history information of this title to which changeover has been performed. At this time, the title menu image which the DVD device 1 creates is an image in which the title selection is also changed over. Furthermore, when in the step S19 it has been decided that input for replaying a title has been performed, then the DVD device 1 terminates this selection reception processing of the step S1. When this selection reception processing is finished, then the DVD device 1 starts the replay of the title (step S2).

It should be understood that although, in this embodiment, in the title selection processing in the step S1, it is arranged only to generate and to output a title menu image which displays only replay history information for the title which is selected, it would also be acceptable to arrange to display, all at one time, replay history information for all of the titles which are recorded upon the DVD 10 which is set into the device main body. In this case, it is possible to present to the user this replay history information for all of the titles which are recorded upon the DVD 10 all at one time, so that it is possible to enhance the user experience by yet a further level. However since, in this case, there are a large number of items to be displayed upon the screen of the display device 11, accordingly, if the screen size of the display device 11 is small, then the display of each of the items becomes small, and the title menu image may become hard for the user to see, which is not desirable. To express this in another manner, if the screen size of the display device 11 is large, then it is desirable to display the replay history information for all of the titles all together. Furthermore, it would also be acceptable to arrange for the user to be able to change over the titles for which replay history information is displayed upon the title menu image, between being only the title which is selected, and being all of the titles which are recorded upon the DVD 10.

Moreover, if the DVD device 1 is not able to acquire an identification number of the DVD 10 in the step S11, then it generates and outputs from the output unit 7 a title menu image in which no replay history information is displayed (step S20). In concrete terms, it displays a title menu image in which the replay history information in the lower portion of the title menu image shown in FIG. 5 is not present. When the input of the selected title is changed over (step S21), the DVD device 1 returns to the step S20, and creates and outputs from the output unit 7 a title menu image in which the selection of the title has been changed over. Furthermore, when in the step S22 it has been decided that input for title replay has been performed, the DVD device 1 terminates this selection reception processing of the step S1. When it has ended this selection reception processing, the DVD device 1 replays the title which is selected at this time point (step S2).

When it has started the replay of the title in the step S2, the DVD device 1 waits until the time at which the replay of this title ends (step S3). In the step S3, the system waits for the user to perform input actuation for stopping replay of the title, or until the time at which replaying of the title which is being replayed is finished. When in the step S3 the DVD device has decided that the time has arrived to stop replaying, it stops replaying the title (step S4), and updates the replay history information for the title which has been replayed this time (step S5). In this step S5, the DVD device 1 updates the replay time for the time before to the replay time this time, and moreover updates the replay date and time for the time before to the current date and time. Furthermore, the number of times this title has been replayed is incremented by unity. Also, as far as the replay completed condition is concerned, the DVD device 1 compares together the replay completed condition for this time and the replay completed condition which is stored, and performs updating if it is required. When the DVD device 1 has completed the processing of the step S5, it terminates this processing routine. It would also be acceptable to arrange for the DVD device 1 to return to the step S1 at this time, and to repeat the above described processing.

Since, when the replaying of this title is completed in this manner, the DVD device 1 updates the replay history information for this title, accordingly it is always able to present adequate replay history information to the user. Furthermore, since the DVD device 1 is built so as to store the replay history information upon the hard disk 8A of the storage unit 8 which is provided in the main portion of the DVD device 1, accordingly it is possible to utilize the recording region of the DVD 10 in an effective manner. Moreover, since during replay the DVD device 1 does not need to perform processing upon the DVD 10 in order to rewrite its replay history information, accordingly it is possible to keep down increase of the time period required for performing the processing for stopping the replay (the processing in the step S4).

The explanation of the embodiment above is not to be considered as being limitative of the present invention in any way, since all of its features are shown only by way of example. Accordingly, the scope of the present invention is not defined by the above described embodiment, but by the range of the Claims. Moreover, it is intended that all changes of the same meaning as the scope of the Claims, and all changes within their range, should be included within in the scope of the present invention.

What is claimed is:

1. An optical disk device, comprising:
    an output unit which outputs to a display device a title menu image, in which is displayed a list of title names of titles which are recorded upon an optical disk;
    a selection unit which selects any desired title from among the titles whose title names are displayed in the title menu image;
    a replay unit which, when replay of a title has been commanded, starts replay of the title selected by the selection unit at that time point;
    a replay history information acquisition unit which acquires, for each title recorded upon the optical disk, replay history information which includes the replay time for that title when it was replayed the previous time, the date and time of the replay the previous time, and the number of times that title has been replayed up until now; and
    an update unit which, when replay of a title has been performed by the replay unit, updates the replay history information for the title which has been replayed this time;
    wherein a title menu image is outputted in which, for a title recorded upon the optical disk, based upon the replay history information which has been acquired by the replay history information acquisition unit, there are displayed the previous replay time, the date and time of the previous replay, and the number of times that title has been replayed up until now.

2. The optical disk device according to claim 1, further comprising a storage unit in which, for each optical disk, replay history information for each title recorded upon that optical disk is stored, and wherein the update unit updates the replay history information stored by the storage unit for that title.

3. The optical disk device according to claim 1, wherein the output unit outputs a title menu image in which are displayed, only for a title which is selected by the selection unit, based upon the replay history information which has been acquired by the replay history information acquisition unit, the previous replay time, the date and time of the previous replay, and the number of times that title has been replayed up until now.

* * * * *